UNITED STATES PATENT OFFICE.

ROSS C. PURDY, OF BUFFALO, NEW YORK, AND MILTON F. BEECHER AND ABRAHAM ALBERT KLEIN, OF WORCESTER, MASSACHUSETTS, ASSIGNORS TO NORTON COMPANY, OF WORCESTER, MASSACHUSETTS, A CORPORATION OF MASSACHUSETTS.

BONDED ARTICLE OF MAGNESIA AND ALUMINA.

1,394,442.   Specification of Letters Patent.   Patented Oct. 18, 1921.

No Drawing.   Application filed October 7, 1919. Serial No. 329,160.

*To all whom it may concern:*

Be it known that we, Ross C. Purdy, residing at Buffalo, N. Y., and Milton F. Beecher and Abraham Albert Klein, residing at Worcester, in the county of Worcester and State of Massachusetts, citizens of the United States of America, have invented certain new and useful Improvements in Bonded Articles of Magnesia and Alumina, of which the following is a full, clear, and exact specification.

Our invention relates to bonded articles and more particularly to articles containing magnesia which are adapted to withstand high temperatures.

The principal object of the invention is to utilize one highly refractory material to bond another under such conditions as to produce a body of considerable mechanical strength and specifically to bond magnesia with a refractory material which tends to unite chemically with the magnesia and thus form an integral union between the different refractory granules.

A further object is to avoid shrinkage difficulties by employing preshrunk materials both for the granular refractory and for the substance which serves to form the bond.

Other objects will be apparent from the following disclosure.

Theoretical laboratory investigations of magnesia and alumina combinations have been made for determining the melting point curve of the two chemicals and their eutectics and for ascertaining the refractory properties of the elements as well as the compound magnesium aluminate; but it has not heretofore been considered feasible to make a commercially practicable refractory article of these materials within the temperature range of the ordinary ceramic kiln. In the course of our experimentation, we have found it possible to form a bonded article of the two highly refractory materials aluminum oxid and magnesium oxid by ordinary ceramic furnacing operations under such conditions as will produce a chemical compound between some of the magnesia and alumina which will form and serve as a bond for the coarse granular material of one of its oxid constituents at a sintering temperature below that of the melting point of any eutectic of the system magnesia-alumina, *i. e.*, any known compound or eutectic formed between magnesia or alumina, and magnesium aluminate, the lowest melting point of these being 1925° C. plus or minus 20° C., so far as has been determined.

When magnesia and alumina containing small amounts of impurities are heated together at a comparatively low temperature, say cone 13 or about 1300° C., there is a tendency for these materials to combine as crystalline magnesium aluminate ($MgO.Al_2O_3$) or spinel. The amount of spinel actually formed depends upon the physical characteristics of the ingredients, their sizes, the kinds and amounts of impurities present and generally upon the method of treatment employed. This reaction producing spinel at temperatures considerably lower than indicated by phase rule considerations of the pure chemical oxids MgO and $Al_2O_3$ appears to be due to the presence of a liquid phase formed by the low melting fluxes or impurities incorporated with the main refractory ingredients.

In order to form a refractory ware or furnace lining which will be free from shrinkage cracks that tend to form during the drying and firing operations. we utilize preshrunk granules for the main ingredient and we bond these granules by heat treating them with a finely divided material capable of uniting therewith to form a chemical compound. If magnesia is to be employed as the main ingredient, we select a pre-shrunk material or crystalline magnesia which has been shrunk to the maximum extent, preferably by heating in an electric furnace. This electrically shrunk magnesia, which may vary in position from the pure crystalline magnesia to the impure partially fused forms, is now found to make a better refractory than the calcined material heretofore commonly used for such purposes, owing to the fact that it has a physical constancy of volume during the various heat treatments necessary in the formation of a refractory article.

Alumina is equally satisfactory as the main ingredient of the refractory and when so used should be shrunk to a physically constant volume or to a crystalline condition. While natural crystalline alumina, such as corundum and emery, is available for our purposes, we preferably employ artificial materials of predetermined compositon or with controllable amounts of impurities.

One form may be made by fusing bauxite, as obtainable from various sources, in an electric furnace and crystallizing the same. This electrically fused or crystalline alumina may be of various degrees of purity depending upon the type of refractory required and the heat treatment to be employed. The crushed granular material, whether magnesia or alumina, generally has a grain size finer than that which will just pass through a sieve of six meshes to the linear inch. The other material intended to serve as a bond is ordinarily ground to a fine condition and is employed in such an amount as will produce the desired characteristics in the fired article. For certain types of refractory the finely divided material used as a bond may be in the amorphous condition, but we preferably employ the pre-shrunk or crystalline form in producing refractory bodies of the better class.

As a specific example of our invention, assuming it is desired to bond magnesia grains with alumina, we mix electrically shrunk magnesia granules with at least 5% of finely divided electrically fused alumina. This mixture is then molded to the desired form, preferably in a plastic condition by means of water or various suitable temporary bonding agents, and fired in a ceramic kiln or other heating furnace at a temperature below the melting point of alumina until sufficient reaction has taken place to bond the ingredients together. The time of firing obviously depends upon the type of furnace and the temperature employed, it being found satisfactory to fire for 140 hours at cone 12 or approximately 1275° C., but this time may be reduced to 40 or less number of hours by raising the temperature of the process. If the temperature of firing is not much above 1300° C., or if the heat treatment does not approach cone 13 the formation of spinel is slow. If a larger proportion of spinel is desired, the temperature of firing may be raised or the time of firing prolonged. It is also to be noted that crystalline alumina grains may be bonded with finely divided magnesia by similar methods. Various methods well known to ceramic workers may obviously be used in connection with this invention.

The ordinary sources of alumina such as bauxite contain a considerable proportion of impurities. In many instances these impurities are not objectionable and may be utilized as fluxes or aids in the bonding action. The silicates particularly form various compounds with the alumina and the magnesia, such as aluminum silicate or magnesium silicate, and if lime is prseent a compound such as calcium magnesium silicate ($CaO.MgO.SiO_2$) may be formed, as well as another compound known as gamma calcium silicate ($2CaO.SiO_2$). When such impurities are present spinel crystals are found interspersed throughout this pre-fused mass of silicates. Upon examination of this mass under the microscope one finds that the grains of magnesia are surrounded by the bond of pre-fused alumina and its compounds, there being at the surfaces of the magnesia grains zones of minute intergrown crystals of spinel and the reaction silicates, which, uniting with similar zones surrounding other magnesia grains, serve to bond the mass into a unitary structure. While the ordinary impurities present may be sufficient to cause a satisfactory formation of spinel at the temperature employed, we may utilize fairly pure materials and add thereto various active fluxes of the type found in the impurities or we may utilize foreign materials of the general nature of sodium vanadate, borates, tungstates, boracic acid, etc., to reduce the temperature of formation of magnesium aluminate and bond the granular material together.

It should be understood that this invention is not concerned primarily with the formation and use of spinel as a refractory but relates to bonding granules of refractory magnesia or alumina with spinel formed from finely divided material of one of these oxids combined with surface portions of the other oxid. The actual amount of spinel present in the total mass may comprise a very small proportion of the total mass, since its utility is due to its bonding qualities and not to any refractory characteristics it may possess. It furthermore is to be understood that the term "crystalline" is employed in the claims in a broad sense to cover a material which has been shrunk to such an extent that it will not undergo detrimental changes in size and shape during subsequent firing operations. This material need not necessarily consist of completely crystallized oxid but may comprise the general run of the furnacing operation employed to shrink the mass by fusion and crystallization.

Having thus described our invention what we claim as new and desire to secure by Letters Patent is:

1. The method of making a bonded article of magnesia and alumina comprising mixing pre-shrunk granules of one ingredient with the other ingredient in finely divided condition and heat treating the mixture below the melting point of any eutectic of the magnesia-alumina system to bond the materials into a unitary mass.

2. The method of forming a bonded magnesia article comprising mixing pre-shrunk magnesia grains with a finely divided bonding agent consisting primarily of alumina, and heating the mixture below the fusion point of alumina to form a magnesium aluminate from the ingredients and bond the magnesia granules together.

3. The method of forming a bonded article comprising forming a mixture of magnesia, alumina and a flux, one of said oxids being in a granular, pre-shrunk condition and the other in a finely divided condition, and heating the mass at a temperature below the melting point of any eutectic of the magnesia-alumina system to liquefy the flux and form magnesium aluminate from a portion only of the oxids present and bond the unchanged ingredients together.

4. The method of forming a bonded magnesia article comprising mixing crystalline magnesium oxid grains with a bonding agent consisting primarily of finely divided aluminum oxid containing silicate impurities, and fluxing the silicates and forming spinel from a portion of the magnesia and the alumina under the application of heat at a temperature below the melting point of any eutectic in the magnesia-alumina system and thereby bonding the magnesia grains together.

5. The method of forming a bonded article comprising mixing crystalline magnesia with crystalline alumina with their associated impurities and heating to a temperature below the melting point of any eutectic in the magnesia-alumina system to form spinel from a portion of the oxids present and unitarily bond the ingredients together.

6. The method of forming a bonded magnesia article comprising mixing preshrunk magnesia granules with at least 5% of finely divided alumina and associated fluxing impurities, shaping an article therefrom and heating it above cone 12 but below the melting point of any eutectic in the magnesia-alumina system to flux such impurities and to form spinel from a portion of the oxids present and thereby bond the magnesia granules together.

7. The method of forming a bonded magnesia article comprising mixing crystalline magnesia with a small amount of finely divided crystalline alumina and a low fusing flux and heating the mixture at a temperature below the melting point of any eutectic in the magnesia-alumina system but above cone 12 to melt said flux and to form spinel therein from the magnesia and alumina and thereby bond the magnesia granules and excess alumina into a unitary mass.

8. The method of forming a bonded magnesia article comprising mixing crystalline magnesia with a small amount of finely divided crystalline alumina and silicate impurities and subjecting the mixture to prolonged heat treatment at a temperature between 1275° and 1925° C. and to form spinel therein from the magnesia and alumina and thereby bond the magnesia granules and excess alumina into a unitary mass.

9. A bonded article comprising magnesia and alumina, one of said ingredients being crystalline and forming the major portion of the article, the other having been introduced in a finely divided condition and heat treated to form a magnesium aluminate by reaction *in situ* with surface portions of the crystalline material.

10. A bonded article comprising preshrunk magnesia granules bonded by a mass containing spinel formed *in situ* from finely divided alumina combined with the magnesia.

11. A bonded article comprising magnesia, alumina and flux impurities, granular crystalline material of one of the oxids being bonded by said flux and spinel formed *in situ* from a portion of the oxids chemically combined under the action of heat below the melting point of the compound.

12. A bonded article comprising crystalline magnesia and crystalline alumina bonded together by a magnesium aluminate formed *in situ* from a portion of the main ingredients of the mixture.

13. A bonded article comprising crystalline magnesia granules and finely divided crystalline alumina chemically united by spinel or magnesium aluminate.

14. A bonded article comprising crystalline magnesia granules bonded by finely divided crystalline alumina chemically united with a portion of the magnesia as spinel and by flux impurities associated therewith.

Signed at Worcester, Massachusetts, this 30th day of Sept., 1919.

ROSS C. PURDY.
MILTON F. BEECHER.
A. ALBERT KLEIN.